United States Patent [19]
Cheon

[11] Patent Number: 6,018,436
[45] Date of Patent: Jan. 25, 2000

[54] APPARATUS FOR GUIDING AND PREVENTING SLACKENING OF TAPE IN A VIDEO CASSETTE TAPE RECORDER

[75] Inventor: In Gi Cheon, Seoul, Rep. of Korea

[73] Assignee: LG Electronics Inc, Seoul, Rep. of Korea

[21] Appl. No.: 08/914,786

[22] Filed: Aug. 20, 1997

Related U.S. Application Data

[63] Continuation of application No. 08/621,596, Mar. 26, 1996, abandoned.

[30] Foreign Application Priority Data

Mar. 28, 1995 [KR] Rep. of Korea .......................... 95-5735

[51] Int. Cl.$^7$ .................................................... G11B 15/28
[52] U.S. Cl. ................................................ 360/85; 360/95
[58] Field of Search ....................... 360/85, 95; 242/334, 242/334.6

[56] References Cited

U.S. PATENT DOCUMENTS

| | | | |
|---|---|---|---|
| 5,369,536 | 11/1994 | Konishi et al. | 360/85 |
| 5,434,726 | 7/1995 | Song | 360/85 |
| 5,445,337 | 8/1995 | Kwon | 242/334.6 |
| 5,448,431 | 9/1995 | Kobayashi | 360/85 |
| 5,475,546 | 12/1995 | Choi | 360/85 |
| 5,543,980 | 8/1996 | Fukuzawa | 360/85 |
| 5,612,836 | 3/1997 | Kim et al. | 360/85 |

*Primary Examiner*—William R. Korzuch
*Attorney, Agent, or Firm*—Morgan, Lewis & Bockius LLP

[57] ABSTRACT

An improved apparatus for guiding and preventing the slackening of tape in a VCR which is capable of improving picture quality by absorbing the vibration of the tape. The apparatus includes a tape guide member movable between a first position which does not guide the running of the tape and a second position which does guide the running of the tape in cooperation with a driving force of a driving force transmission unit. A support shaft is fixed to an upper portion of one end of the tape guide member and a tape guide unit is rotatably engaged to the support shaft which engages a tape slackening prevention member disposed at one end of the tape guide member.

6 Claims, 5 Drawing Sheets

APPARATUS FOR GUIDING AND PREVENTING SLACKENING OF TAPE IN A VIDEO CASSETTE TAPE RECORDER

This application is a continuation of application Ser. No. 08/621,596, filed Mar. 26, 1996, now abandoned.

BACKGROUND OF THE INVENTION

1. Field of the Invention

The present invention relates to an apparatus for guiding and preventing slackening of tape in a video cassette tape recorder (VCR), and particularly to an improved apparatus for guiding and preventing slackening of the tape in a video cassette recorder capable of preventing a tape loading malfunction. The malfunction is caused due a portion of the tape being released from the cassette and contacting the upper surface of the head drum. This occurs when the hub of the cassette contacts the reel of the deck and the hub rotates releasing the tension of the tape, thereby releasing a portion of the tape from the cassette. The present invention prevents this occurrence, effectively absorbing the vibration of the tape, thereby enhancing picture quality.

2. Description of the Conventional Art

FIG. 1 shows a conventional deck mechanism for a VCR, which includes loading paths 2 and 3 spaced-apart from a head drum 1 and formed at the left-side and right-side of the head drum 1. Supply-side and take-up-side slant post bases 8 and 9 are positioned at the loading paths 2 and 3 and include supply-side and take-up-side slant posts 4 and 5 and supply-side and take-up-side guide rollers 6 and 7 which move along the loading paths 2 and 3 in cooperation with a driving force of a loading motor (not shown).

With the above-mentioned construction, cassette C is loaded in the deck mechanism of a conventional VCR, where the supply-side and take-up-side slant post bases 8 and 9, as shown in FIG. 1, are placed behind the exposed tape in the cassette C.

When the loading motor is driven in the above-mentioned state, the supply-side and take-up-side slant posts 4 and 5 of the supply-side and take-up-side slant post bases 8 and 9 lead the tape T toward the head drum 1 along the loading paths 2 and 3, so that the tape T is wound onto the outer circumferential surface of the head drum 1.

However, in the conventional deck mechanism of a VCR, a phenomenon sometimes occurs in which the reel 10 rotates the hub 20 of the cassette C when the cassette C is placed onto the deck.

When the above-mentioned phenomenon occurs, the tape T may become loose from the cassette C as indicated in FIG. 1 by the virtual line, or the tape T may be partially unwound within the cassette C.

Therefore, when the tape T is placed on the upper portion of the head drum 1, if the unwinding is substantial enough the tape T does not engage of the supply-side and take-up-side slant posts 4 and 5 and the supply-side and take-up-state guide rollers 6 and 7 the tape T is not loaded properly or not loaded at all.

Therefore, since the loading operation is performed without the aide of the supply-side and take-up-side slant post bases 8 and 9, tape damage and malfunction of the system may occur.

Although the loading operation is performed successfully such that the supply-side and take-up-side slant post bases 8 and 9 lead the tape, since there is not a further element for preventing the vibration of the tape T, the picture quality is degradated due to tape vibrations.

SUMMARY OF THE INVENTION

Accordingly, it is an object of the present invention to provide an apparatus for guiding and preventing the slackening of tape in a video cassette recorder, which overcome the problems encountered in a conventional apparatus for guiding and preventing the slackening of the tape in a video cassette tape recorder.

It is another object of the present invention to provide an improved apparatus for guiding and preventing the slackening of the tape in video cassette tape recorder capable of preventing a tape damage when a tape becomes loose due to the rotation of a cassette hub when the cassette is placed on reel of a deck, thereby improving the loading operation of the tape.

It is another object of the present invention to provide an improved apparatus for guiding and preventing the slackening of the tape in the video cassette tape recorder capable of improving a picture quality by absorbing the vibration of a tape.

To achieve the above objects, there is provided an apparatus for guiding and preventing slackening of tape in a video cassette tape recorder, which includes a tape guide member movable between a first position which does not guide the running of a tape and a second position which guides the running of the tape in cooperation with the driving force of the driving force transmission unit; a support shaft fixed to an upper portion of one end of the tape guide member; a tape guide unit rotatably engaged to the support shaft; and a tape slackening prevention member disposed at one end of the tape guide member.

DETAILED DESCRIPTION OF THE INVENTION

Figure 1:
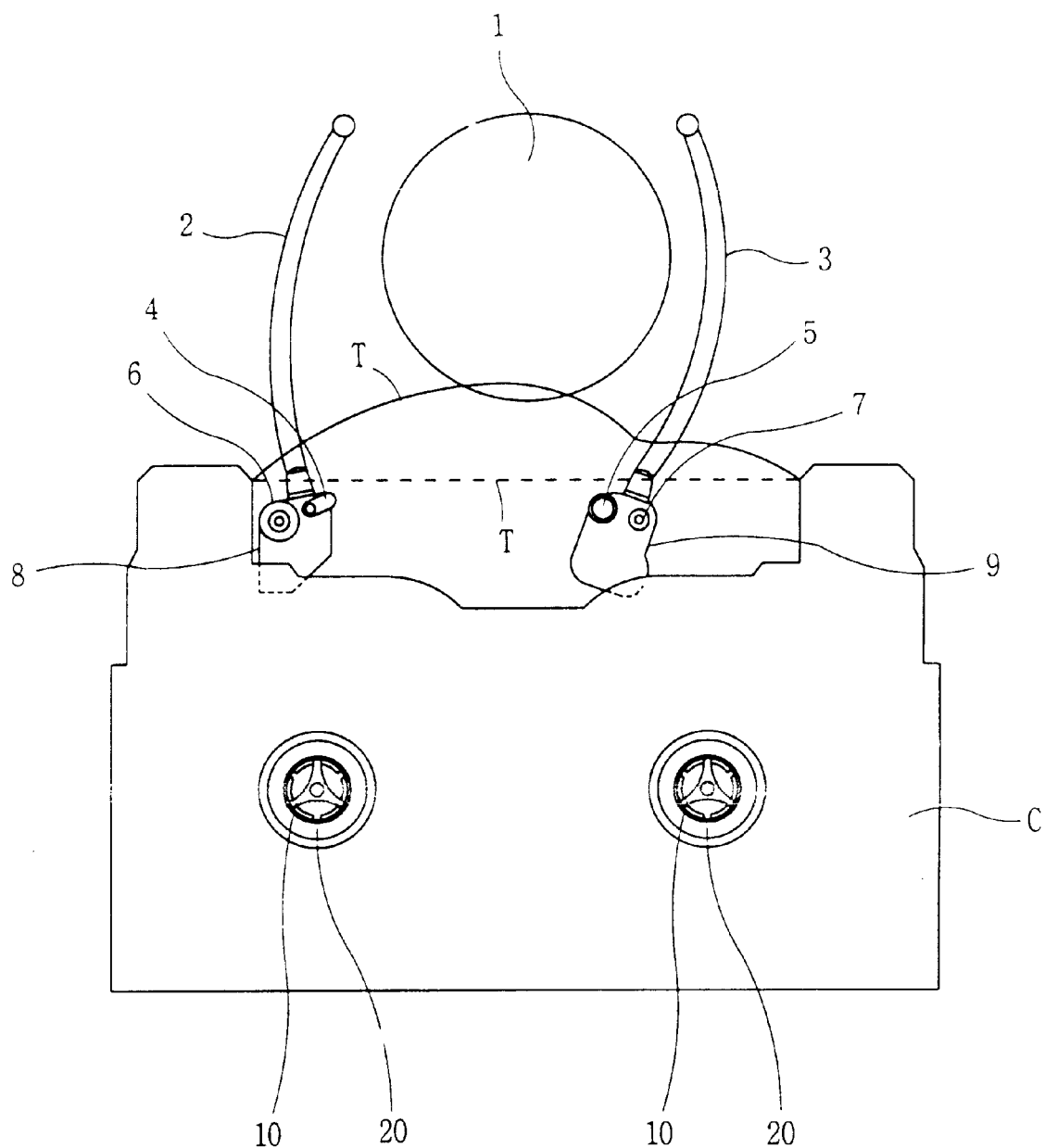
FIG. 1 is a schematic plan view of a conventional deck mechanism of a VCR.
Figure 2:
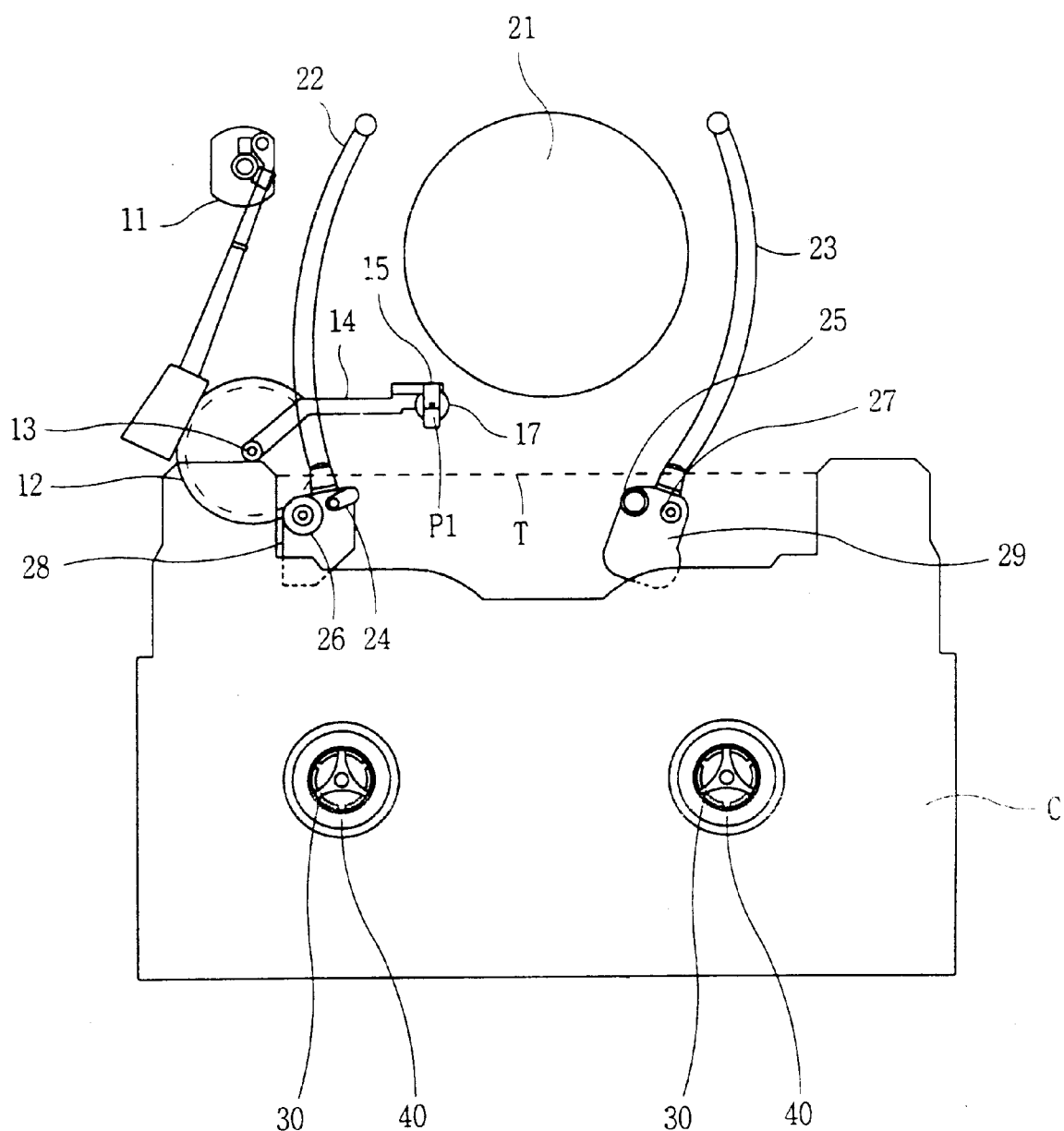
FIG. 2 is a schematic plan view of a deck mechanism of a VCR to which an apparatus for guiding and preventing slackening of tape is adapted when a tape is unloaded in the system according to the present invention.

FIG. 2 shows an apparatus for guiding and preventing slackening of tape in a VCR according to the present invention, which includes loading paths 22 and 23 spaced-apart from a head drum 21 and formed at the left-side and right-side of the head drum 21.

In addition, supply-side and take-up side slant post bases 28 and 29 having supply-side and take-up-side slant posts 24 and 25 and supply-side and take-up-side guide rollers 26 and 27, which move along the loading paths 22 and 23 in cooperation with the driving force of the loading motor (not shown), are provided at the loading paths 22 and 23.

Figure 5:
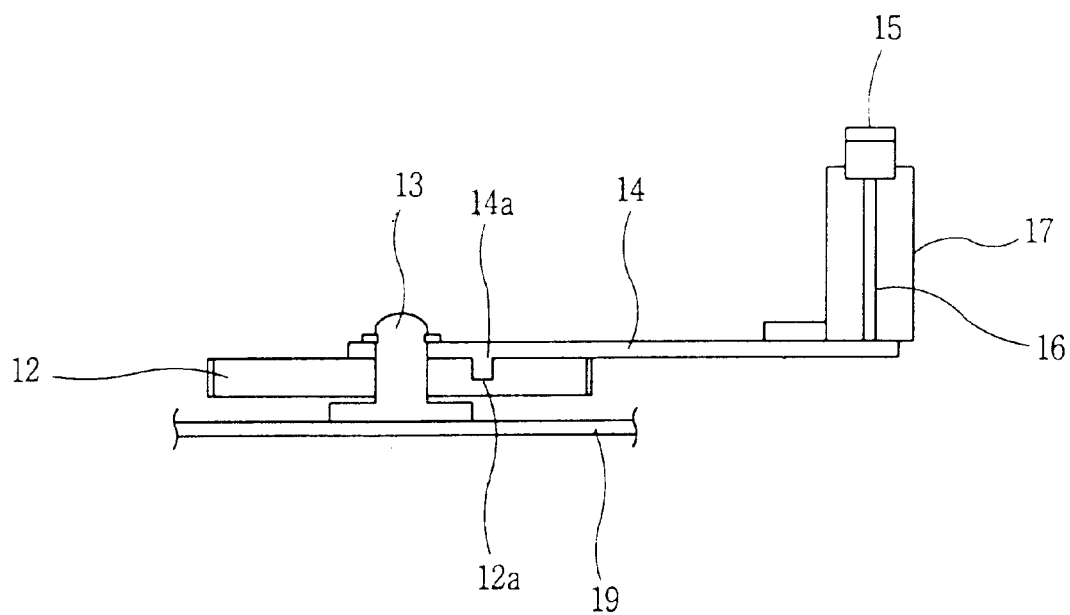
FIG. 5 is a cross-sectional view of an apparatus for guiding and preventing slackening of tape in a VCR according to the present invention.

However, as shown in FIGS. 2 and 5, a center shaft 13 is provided at the main base 26 and outwardly spaced-apart from the supply-side slant post 24 and the supply-side guide roller 26 by a predetermined distance in a unloading state, and a cam gear 12 is rotatably inserted onto the center shaft 13 which is fixed to base 19.

A predetermined shaped cam groove 12a is formed at the upper surface of the cam gear 12, (see FIG. 4) and a lever 14, which is a tape guide member, is rotatably inserted onto the center shaft 13 at the upper portion of the cam gear 12 so that the lever 14 drivingly communicates with the cam gear 12.

Figure 3:
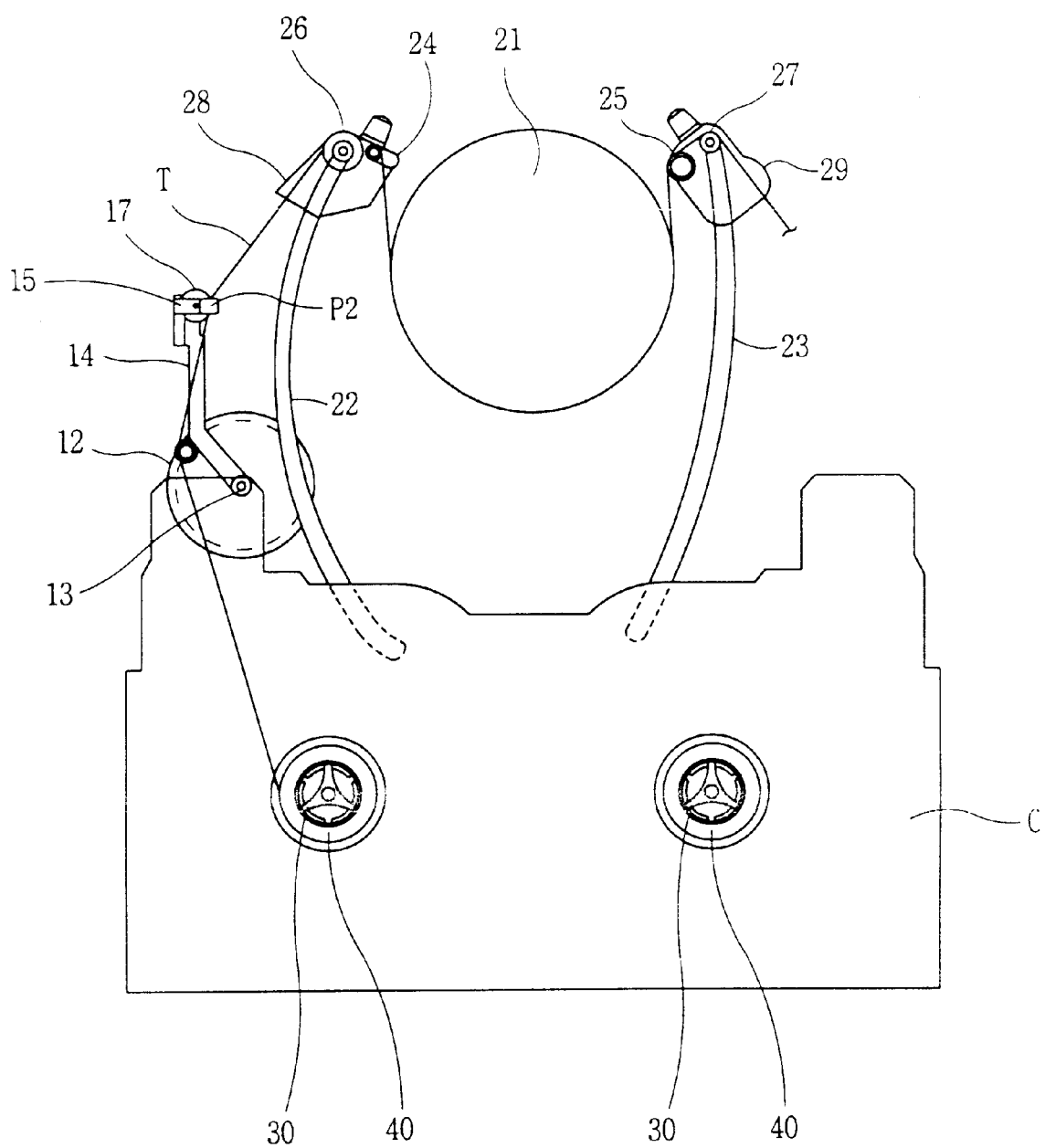
FIG. 3 is a schematic plan view of a deck mechanism of a VCR to which an apparatus for guiding and preventing slackening of tape is adapted when a tape is loaded in the system according to the present invention.
Figure 4:
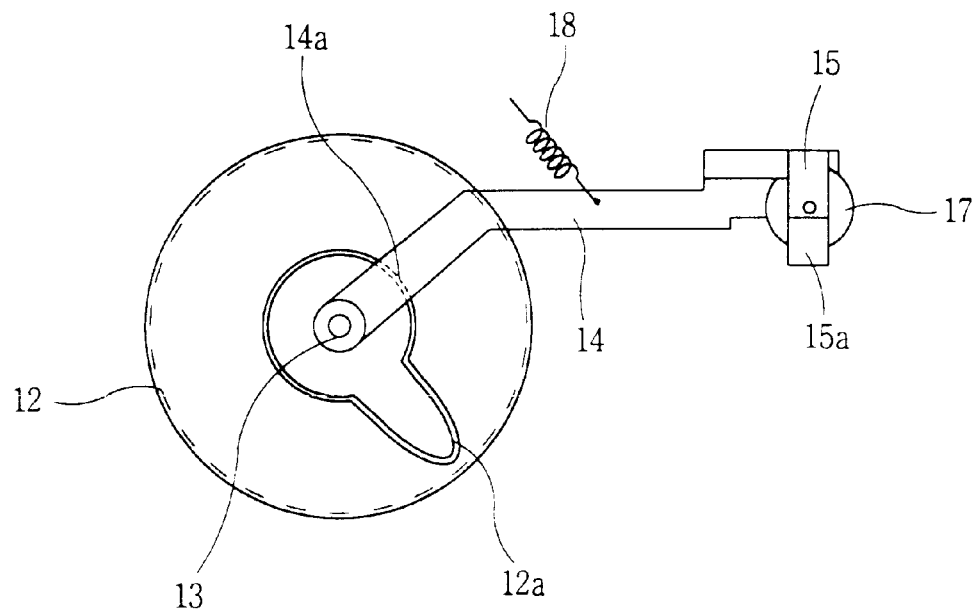
FIG. 4 is a plan view of an apparatus for guiding and preventing slackening of tape in a VCR according to the present invention.

In addition, as shown in FIGS. 2 through 4, a guide protrusion 14a inserted into the cam groove 12a is formed at the lower surface of the lever 14. When the cam gear 12 is driven by the driving force of a driving force transmission unit 11 disposed at one side of the deck, the lever 14 moves along the cam groove 12a. That is, the lever 14 moves within a range between a first position P1 which does not guide the running of the tape T and a second position P2 which guides the running of the tape T.

Here, an elastic member 18, such as a tension spring or the like, of which one end is connected to a predetermined portion of the deck, is connected to the lever 14.

In addition, a support shaft 16 is fixed to the upper portion of one end of the lever 14, and an inertial roller 17 is rotatably engaged to the support shaft 16.

Figure 6:
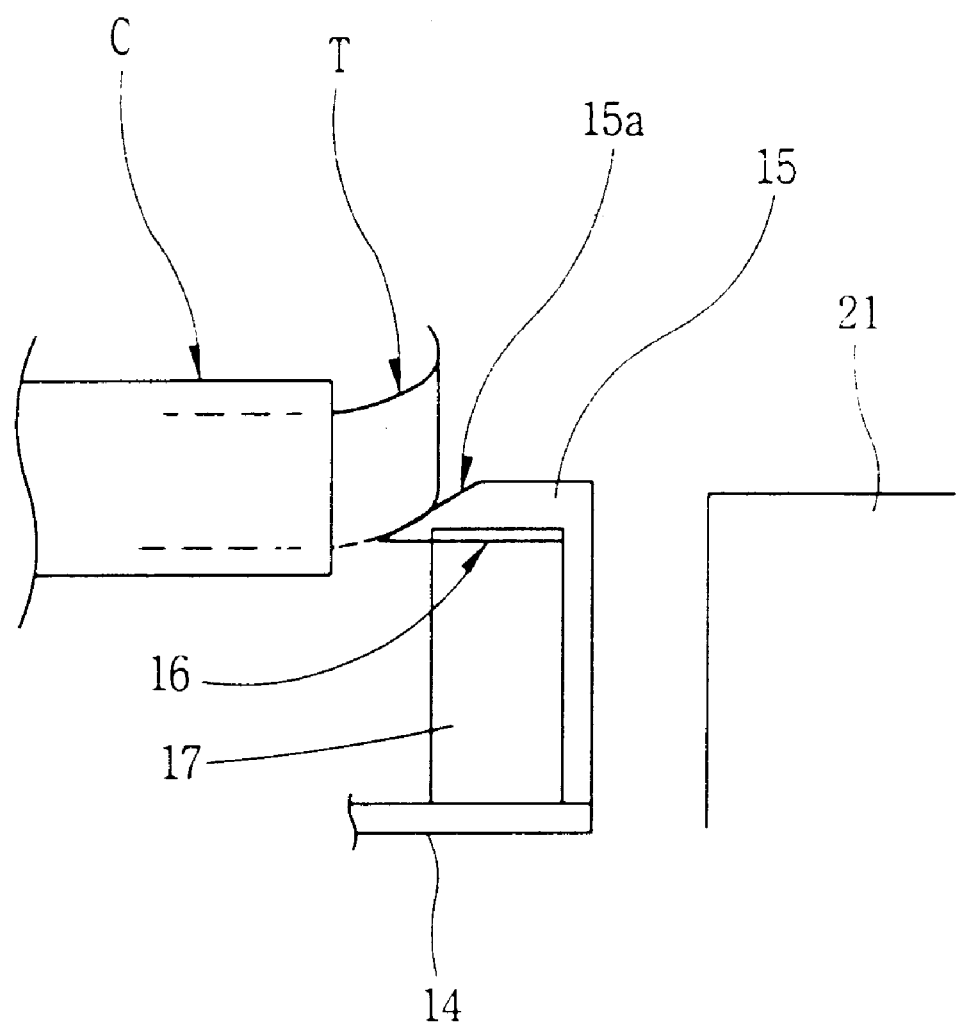
FIG. 6 is a side view showing a positional relationship between an apparatus for guiding and preventing slackening of tape and tape guide apparatus and a head drum according to the present invention showing the position of the tape (T) withdrawn from the cassette (C) during loading or ejecting.

As shown in FIG. 6, a tape slackening prevention member 15 is disposed immediately behind the inertia roller 17, of which one end is connected to the upper portion of the support shaft 16 surrounding the inertia roller 17 and the opposing end is connected to the upper portion of the tape guide member lever 14.

An inclination section 15a is formed at the upper portion of the inertia roller 17 so as to prevent the unwound portion of the tape from ensuing on the upper portion of the head drum 21.

The inclination section 15a is disposed toward the cassette C when it is at the unguided tape first position P1.

The operation and effects of the apparatus for guiding and preventing the slackening of tape in a VCR according to the present invention will now be explained.

Referring to FIG. 2, when the cassette C is loaded in the state that the deck mechanism is in the unloading mode, the supply-side and take-up-side slant post bases 28 and 29 are positioned at a predetermined position behind the exposed tape T in the cassette C.

However, when the cassette C is placed on the deck, and the hub 40 of the cassette C is inserted onto the reel 30 of the deck, upon contact with each other the cassette C rotates.

When the above-mentioned phenomenon occurs, the tape T becomes partially unwound from the cassette C.

In the present invention, when the tape T becomes partially unwound from the cassette C as mentioned above, the partially unwound portion of the tape T comes into contact with the inclination section 15a of the tape slackening prevention member 15 before it comes into contact with the head drum 21, so that the tape T is downwardly guided by the inclination section 15a and does not conduct the head drum 21, but is placed between the head drum 21 and the supply-side and take-up-side slant post bases 28 and 29.

Therefore, before the unwound portion of the tape T comes into contact with the head drum 21, the unwound portion of the tape T comes into contact with the inclination section 15a and is downwardly guided and placed in the lead (not shown) of the cassette C based on one fact that the tape T is not overly unwound.

In this state, when the loading motor is driven, and the supply-side and take-up-side slant post bases 28 and 29 move, the supply-side and take-up-side slant posts 24 and 25 of the supply-side and take-up-side slant post bases 28 and 29 lead the tape T toward the head drum 21 along the loading paths 22 and 23.

As a consequence, the tape T is wound onto the outer circumferential surface of the head drum 21.

Additionally, a lever 14 rotates in the counterclockwise direction about the guide protrusion 14a which is inserted into the cam groove 12a of cam gear 12 and cooperates with the rotation of the cam gear 12 driven by the driving force transmission unit 11, and the tape running system is achieved thereby as shown in FIG. 3.

In addition, the apparatus for guiding and preventing the slackening of tape in a VCR according to the present invention, as shown in FIG. 3, is operated in a state that the tape T contacts the inertia roller 17, and the vibrations of the tape T is effectively absorbed by the inertia roller 17, thereby improving the picture quality.

As described above, the apparatus for guiding and preventing the slackening of tape in a VCR according to the present invention is directed to basically placing the unwound portion of the tape, which becomes loose due to the rotation of the cassette hub when the cassette is placed on the deck, between the head drum and the supply-side and take-up-side slant post bases by guiding the loose portion of the tape thereto before the loose portion of the tape comes into contact with the head drum. That is, the loose portion of the tape is not placed on the upper surface of the head drum, thus preventing tape damage, improving the loading operation of the tape, and absorbing the vibration of the tape thereby improving the picture quality.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An apparatus for guiding and preventing slacking of tape in a video cassette tape recorder (VCR) including a head drum, the apparatus comprising:

a tape guide member movable between a first position which does not guide a running of the tape and which is adjacent to a front side of the head drum, and a second position which guides the running of the tape in cooperation with a driving force of a driving force transmission unit;

a support shaft fixed to an upper portion of one end of the tape guide member;

a tape guide unit rotatably engaged to the support shaft; and a tape slackening prevention member disposed on an upper portion of the tape guide unit, the tape slackening prevention member being positioned between the head drum and the tape of a cassette when the tape guide member is positioned at the first position and being responsive to insertion of the tape to a play position within the video cassette recorder so as to contact the tape and apply a force to the tape prior to the tape contacting the head drum.

2. The apparatus of claim 1, wherein the tape slackening prevention member includes an inclination section formed toward a cassette insertion side when the tape guide member is at the first position.

3. The apparatus of claim 1 or 2, wherein the tape slackening prevention member is fixed to the support shaft.

4. An apparatus for guiding and preventing slacking of tape in a video cassette tape recorder, the apparatus comprising:

a tape guide member movable between a first position which does not guide a running of the tape and a second position which guides the running of the tape in cooperation with a driving force of a driving force transmission unit, wherein the tape guide member includes a guide protrusion formed at a lower surface of the tape guide member in communication with a cam groove formed on an upper surface of a cam gear such that the tape guide member is moved along the cam groove when the cam gear is rotated about a center shaft in cooperation with a driving force of the driving force transmission unit;

a support shaft fixed to an upper portion of one end of the tape guide member;

a tape guide unit rotatably engaged to the support shaft; and a tape slackening prevention member disposed at one end of the tape guide unit for preventing loose tape from contacting the head drum, the tape slackening prevention member being positioned between the head drum and the tape of a cassette when the tape guide member is at the first position.

5. The apparatus of claim 4, wherein the tape slackening prevention member includes an inclination section formed toward a cassette side when the tape guide member is at the first position.

6. A video cassette tape recorder (VCR) that includes a deck for receiving a removable video tape cassette, the VCR comprising:

a head drum;

a supply-side slant post and a take-up side slant post for loading tape from the video tape cassette to the head drum;

a tape guide member movable between a first position located between the head drum and the tape cassette for preventing unwound tape from contacting the head drum when the tape cassette is loaded onto the deck and a second position which guides a running of the tape in cooperation with a driving force of a driving force transmission unit when the tape is loaded onto the head drum by the supply-side and the take-up side slant posts;

a support shaft fixed to an upper portion of one end of the tape guide member;

an inertial roller rotatably engaged to the support shaft to contact the tape when the tape guide member is in the second position so that vibrations of the tape are absorbed by the inertial roller; and an inclination section formed at an upper portion of the inertial roller such that when the tape guide member is at the first position any unwound tape contacts the inclination section and is downwardly guided so that it is placed between the tape guide member and the tape cassette.

* * * * *